United States Patent
Chiba et al.

(10) Patent No.: US 7,990,424 B2
(45) Date of Patent: Aug. 2, 2011

(54) IMAGING DATA PROCESSING DEVICE, IMAGING DATA PROCESSING METHOD, AND IMAGING ELEMENT

(75) Inventors: Takuma Chiba, Osaka (JP); Kazuo Okamoto, Osaka (JP); Yuji Nagaishi, Osaka (JP); Tatsuro Juri, Osaka (JP)

(73) Assignee: Panasonic Corporation, Osaka (JP)

(*) Notice: Subject to any disclaimer, the term of this patent is extended or adjusted under 35 U.S.C. 154(b) by 814 days.

(21) Appl. No.: 11/993,942

(22) PCT Filed: Jul. 7, 2006

(86) PCT No.: PCT/JP2006/313484
§ 371 (c)(1),
(2), (4) Date: Dec. 26, 2007

(87) PCT Pub. No.: WO2007/010753
PCT Pub. Date: Jan. 25, 2007

(65) Prior Publication Data
US 2009/0128645 A1   May 21, 2009

(30) Foreign Application Priority Data

Jul. 15, 2005 (JP) ................................. 2005-206833

(51) Int. Cl.
*H04N 5/225* (2006.01)
*H04N 5/228* (2006.01)

(52) U.S. Cl. ................ 348/220.1; 348/218.1; 348/222.1

(58) Field of Classification Search ............... 348/220.1, 348/218.1, 222.1, 229.1
See application file for complete search history.

(56) References Cited

U.S. PATENT DOCUMENTS

| 2002/0024602 A1* | 2/2002 | Juen ............................... 348/220 |
| 2003/0077074 A1 | 4/2003 | Okamoto et al. |
| 2005/0146623 A1 | 7/2005 | Juen |
| 2006/0050154 A1 | 3/2006 | Kobayashi et al. |

FOREIGN PATENT DOCUMENTS

| JP | 10-108121 | 4/1998 |
| JP | 2001-103361 | 4/2001 |
| JP | 2001-128036 | 5/2001 |
| JP | 2002-251819 | 9/2002 |
| JP | 2003-199118 | 7/2003 |
| WO | 2005/020566 | 3/2005 |

OTHER PUBLICATIONS

Chinese Office Action (along with English language translation) issued Dec. 5, 2008 in the Chinese Application No. 200680021044.6.
International Search Report issued Oct. 17, 2006 in the International (PCT) Application of which the present application is the U.S. National Stage.
International Preliminary Report on Patentability issued Jan. 24, 2008 in International (PCT) Application No. PCT/JP2006/313484.

* cited by examiner

*Primary Examiner* — Nicholas G Giles
*Assistant Examiner* — Joel Fosselman
(74) *Attorney, Agent, or Firm* — Wenderoth, Lind & Ponack, L.L.P.

(57) ABSTRACT

A device is provided for taking high resolution still pictures while recording video without pausing video recording. Plural channels are provided for reaching pixel values from a CMOS sensor, and the output of each channel is input to a corresponding A/D conversion circuit. The channels are configured so that the pixels that are added together are read simultaneously. The data added by the pixel value adder is used as the video data for video recording. When a still picture is captured during video recording, the pixel data is stored in memory with capacity to store one frame, and is sequentially output from the image sensor as the still picture data.

9 Claims, 6 Drawing Sheets

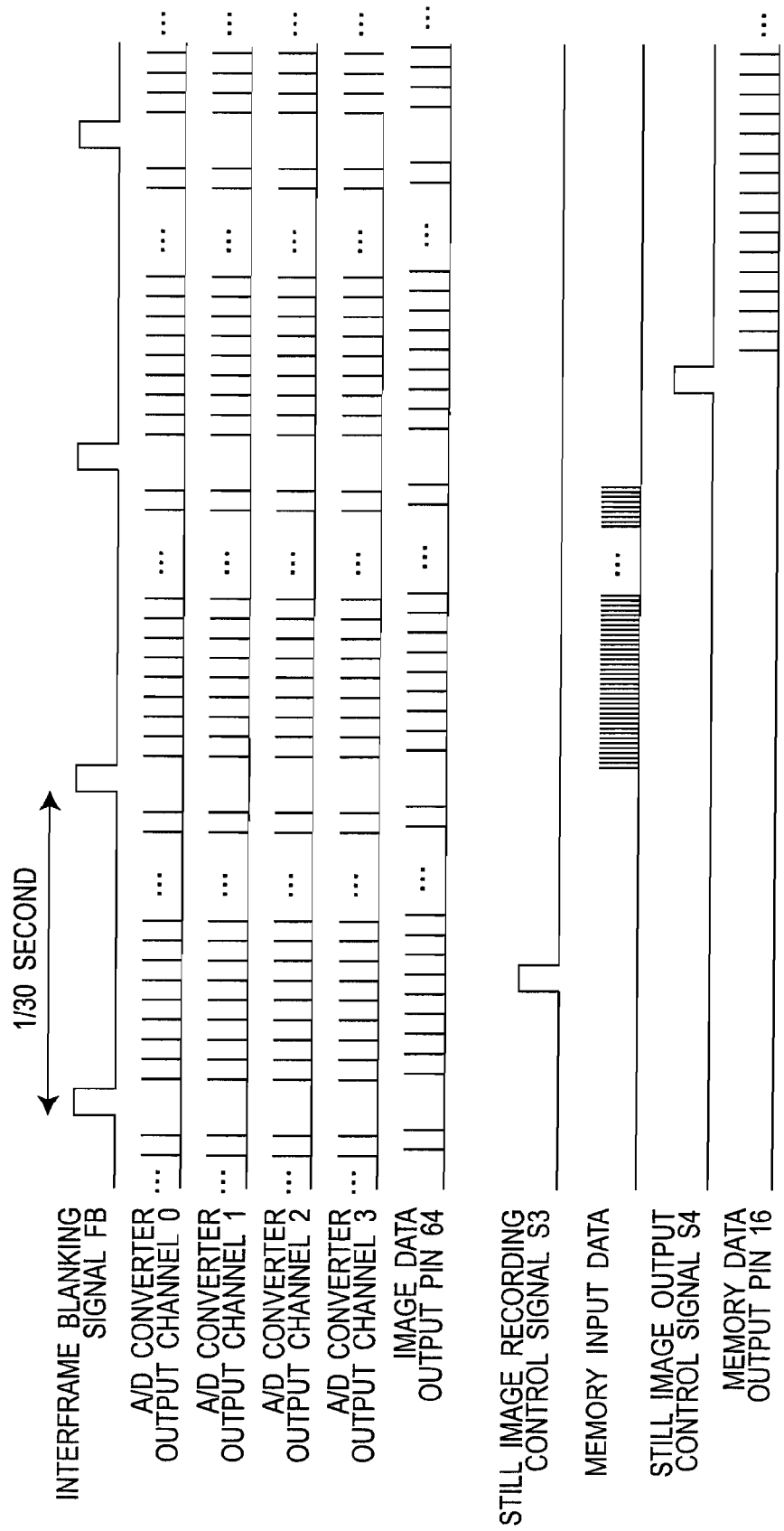

IMAGING DATA PROCESSING DEVICE, IMAGING DATA PROCESSING METHOD, AND IMAGING ELEMENT

BACKGROUND OF THE INVENTION

1. Field of Invention

The present invention relates to an imaging device that uses a MOS-type solid state image sensor, to an imaging method, and to an image sensor.

2. Description of Related Art

Solid state imaging devices (image sensors) are used to convert light from a subject being recorded to an electric signal in imaging devices such as digital cameras and video cameras that are used to capture and store pictures. Solid-state image sensors include primarily CCD image sensors and MOS image sensors, although CCD image sensors are predominant today. This is because CCD image sensors afford better performance including a wider dynamic range and better real-time imaging performance. CCD image sensors suffer from high power consumption and requiring multiple supply voltages, however, and future improvement in these characteristics is believed to be difficult.

MOS image sensors have a narrow dynamic range and weak noise resistance when compared with CCD image sensors, but have improved with regard to these deficiencies as a result of recent research. CMOS image sensors offer numerous benefits that are not afforded by CCD image sensors, including low power consumption and the ability to freely control the order in which pixels are read. Furthermore, because CMOS devices can also be manufactured using the same equipment and materials used to produce LSI devices, the equipment that is currently used to manufacture LSI devices can be used as is to manufacture CMOS image sensors, thus helping to reduce the production cost. CMOS image sensors thus offer numerous benefits and have recently attracted wide interest.

Solid-state image sensors are used in such devices as digital still cameras, video cameras, and cell phones, and produce images by the process described below when recording pictures and video.

(a) Electric signals produced by the CCD or MOS sensor are read one pixel at a time line by line from the first pixel in the sensor, and temporarily stored to relatively inexpensive SDRAM (synchronous DRAM) or other memory device.

(b) When reading and writing one line to SDRAM is completed, line 2, line 3, and so forth are sequentially read to write one frame to SDRAM.

(c) The signals are then read from SDRAM and passed through a signal processing operation such as a zoom process to enlarge or reduce the image, and the data resulting from this operation is temporarily stored to SDRAM again.

(d) The data from the signal processing operation is then read from SDRAM, compressed, and converted to a compressed data format such as JPEG that is suitable for recording, and the compressed data is stored to SDRAM again.

(e) The compressed data is then read at high speed from SDRAM by DMA (direct memory access) control, for example, and output to semipermanent external storage.

The number of pixels in the images that are captured by digital still cameras (DSC) continues to grow. Digital still cameras with resolution exceeding 16 million pixels are now available, and even fairly low cost digital cameras offer resolution of three million to five million pixels.

Video cameras capture and consecutively present from 30 frames to 60 frames per second to output a moving picture image, and the image resolution of each frame ranges from 640×480=307,200 pixels in a VGA image to 1920×1080=2,073,600 pixels in a high definition (HD) image.

While the image sensors used in video cameras only require a resolution of approximately 300,000 pixels and the ability to capture at least 30 frames/second in order to record a VGA size image, demand is also strong for consumer-grade video cameras that can also take still pictures with a resolution of 2 to 3 megapixels. As a result, video cameras are commonly manufactured using high resolution image sensors and are designed to switch the imaging operation to record video and to record still pictures.

Reference patent: U.S. Patent Application Publication No. 2003/0077074 (corresponding to Japanese Laid-open Patent Publication No. 2002-251819)

In order to record video at a frame rate of 1/30 second, the image data for one frame must be read out in 1/30 second or less. It is, however, difficult to read the pixel data for the several megapixels constituting a high resolution still picture in 1/30 second or less.

SUMMARY OF THE INVENTION

An image data processing device according to the present invention has an imaging unit that has pixels in a two-dimensional array and outputs analog data photoelectrically converted from each pixel; an A/D converter operable to convert the analog data to digital data; a video processing unit that executes a video process based on the digital data; a still image processing unit that executes a still image process based on the digital data; a first channel operable to carry data from the A/D converter to the video processing unit; a second channel operable to carry data from the A/D converter to the still image processing unit; and memory disposed to the second channel operable to accumulate the digital data output by the A/D converter.

An image data processing device according to another aspect of the invention additionally has a pixel downsampling unit disposed to the first channel operable to downsample the digital data output from the A/D converter.

In an image data processing device according to another aspect of the invention the A/D converter has a first A/D converter, a second A/D converter, and so forth to an N-th A/D converter (where N is a positive integer), and a scaling process unit connected to an output of each of the first to N-th A/D converters; the input of the first A/D converter, the second A/D converter, and so forth to the N-th A/D converter is respectively connected to a first channel line, a second channel line, and so forth to an N-th channel line; and the pixels of the imaging unit are divided into a plurality of blocks each containing N pixels, and the pixels in the first block are connected to the first channel line, the pixels in the second block are connected to the second channel line, and the pixels in the N-th block are connected to the N-th channel line.

In the image data processing device according to another aspect of the invention the output of each of the first to N-th A/D converters is further connected to the memory.

Another aspect of the invention is an image sensor mounted as a single LSI device, the image sensor having an imaging unit that has pixels in a two-dimensional array and outputs analog data photoelectrically converted from each pixel; an A/D converter operable to convert the analog data to digital data; a first channel operable to carry the digital data from the A/D converter to a first output pin for video processing; a second channel operable to carry the digital data from the A/D converter to a second output pin for still image processing; and memory disposed to the second channel operable to accumulate the digital data output by the A/D converter.

The image sensor according to another aspect of the invention also has a pixel downsampling unit disposed to the first channel operable to downsample the digital data output from the A/D converter.

In an image sensor according to another aspect of the invention the A/D converter has a first A/D converter, a second A/D converter, and so forth to an N-th A/D converter (where N is a positive integer), and a scaling process unit connected to an output of each of the first to N-th A/D converters; the input of the first A/D converter, the second A/D converter, and so forth to the N-th A/D converter is respectively connected to a first channel line, a second channel line, and so forth to an N-th channel line; and the pixels of the imaging unit are divided into a plurality of blocks each containing N pixels, and the pixels in the first block are connected to the first channel line, the pixels in the second block are connected to the second channel line, and the pixels in the N-th block are connected to the N-th channel line.

In an image sensor according to another aspect of the invention the output of each of the first to N-th A/D converters is further connected to the memory.

By using the foregoing arrangements of resolving the problem described above, still pictures with resolution several times the resolution of the images in one frame of a video stream can be captured while recording video without stopping video recording.

Other methods of taking high resolution still pictures during video recording without stopping recording the video include increasing the pixel data output rate or providing a large number of pixel data output pins, but these methods also have problems such as a significant increase in power consumption caused by increasing the output rate, and increased cost and difficulty packaging the device caused by increasing the number of output pins. The present invention solves all of these problems and enables capturing high resolution still pictures during video recording without stopping recording the video.

BRIEF DESCRIPTION OF THE DRAWINGS

FIG. 6 is a waveform diagram of signals in the image sensor in the second embodiment of the invention.

DETAILED DESCRIPTION OF THE PREFERRED EMBODIMENTS

First Embodiment

Figure 1:
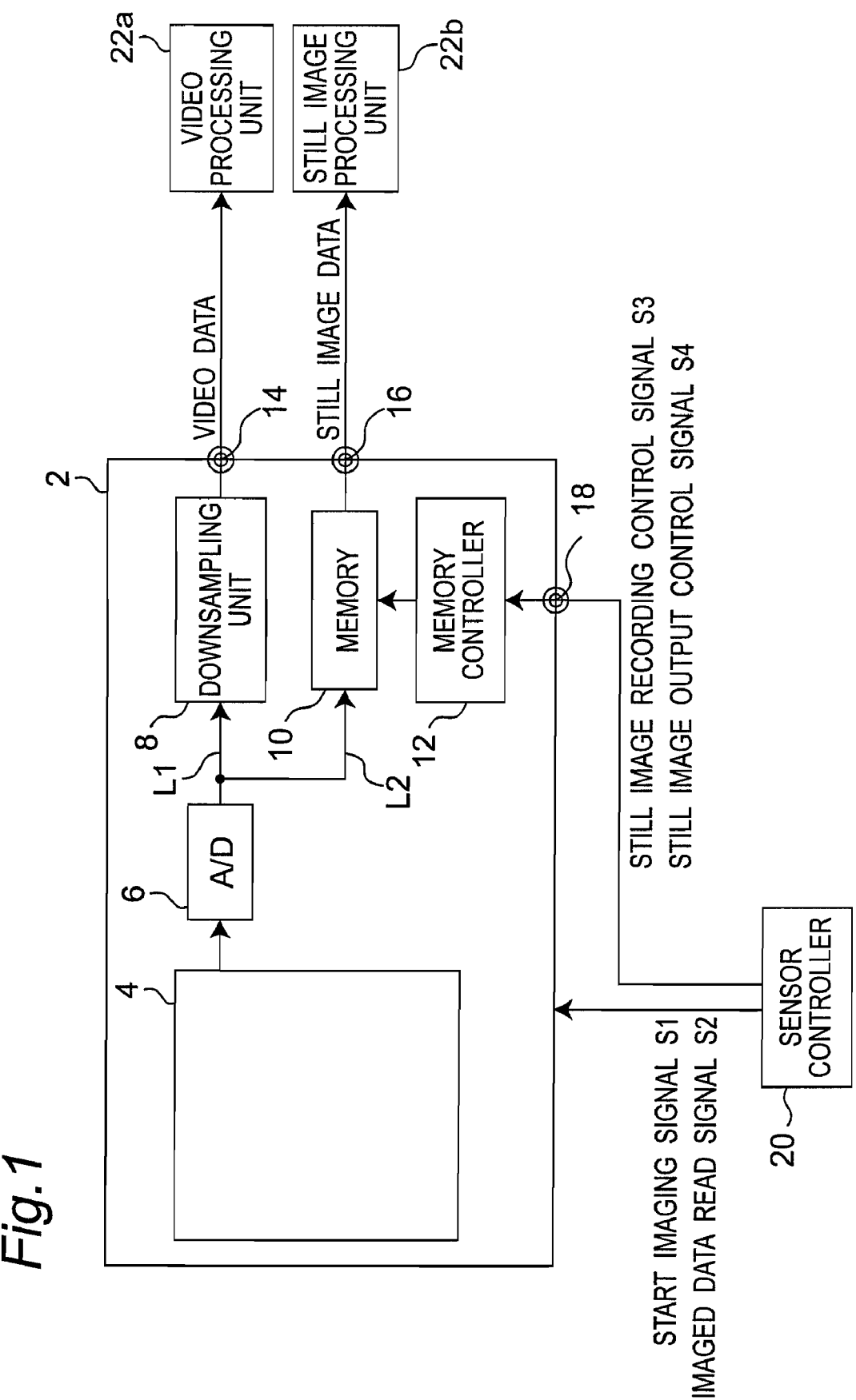
FIG. 1 is a block diagram of a first embodiment of the invention.

FIG. 1 shows an image data processing device according to a first embodiment of the invention.

This image data processing device has an image sensor 2, a sensor controller 20, a video processing unit 22a, and a still image processing unit 22b.

The image sensor 2 has an imaging unit 4 for converting light to an electric charge, an A/D converter 6 for converting the charges output from the imaging unit 4 to digital data, a downsampling unit 8 for sampling the digital data from the A/D converter 6 in time, memory 10 for temporarily storing the digital data from the A/D converter 6, and a memory controller 12 for controlling the memory.

The imaging unit 4 has pixels arranged in a two dimensional array, that is, on two perpendicular axes (x-axis and y-axis), and more specifically has an array of 1920 horizontal pixels by 1440 vertical pixels for a total 2,764,800 pixels. The image sensor 2 is mounted on a single LSI chip and may also be referred to herein as image sensor LSI device 2.

A sensor controller 20, a video processing unit 22a, and a still image processing unit 22b are connected to the image sensor LSI device 2. The video processing unit 22a and the still image processing unit 22b can be mounted on discrete IC chips or on the same chip. The video processing unit 22a handles video signal processing for MPEG signals, for example, and the still image processing unit 22b handles still image processing for JPEG signals, for example. The sensor controller 20 generates a start imaging signal S1, an imaged data read signal S2, a still image recording control signal S3, and a still image output control signal S4, and inputs these signals to the image sensor LSI device 2. More specifically, when the start imaging signal S1 is input, the image sensor 2 converts light intensity to an electric signal and accumulates the electric signals for each pixel. When the imaged data read signal S2 is input, the electric signals accumulated for each pixel of the image sensor 2 are output from the imaging unit 4. The electric signals for each pixel read from the imaging unit are input to the A/D converter 6 and converted to digital signals.

Figure 2:
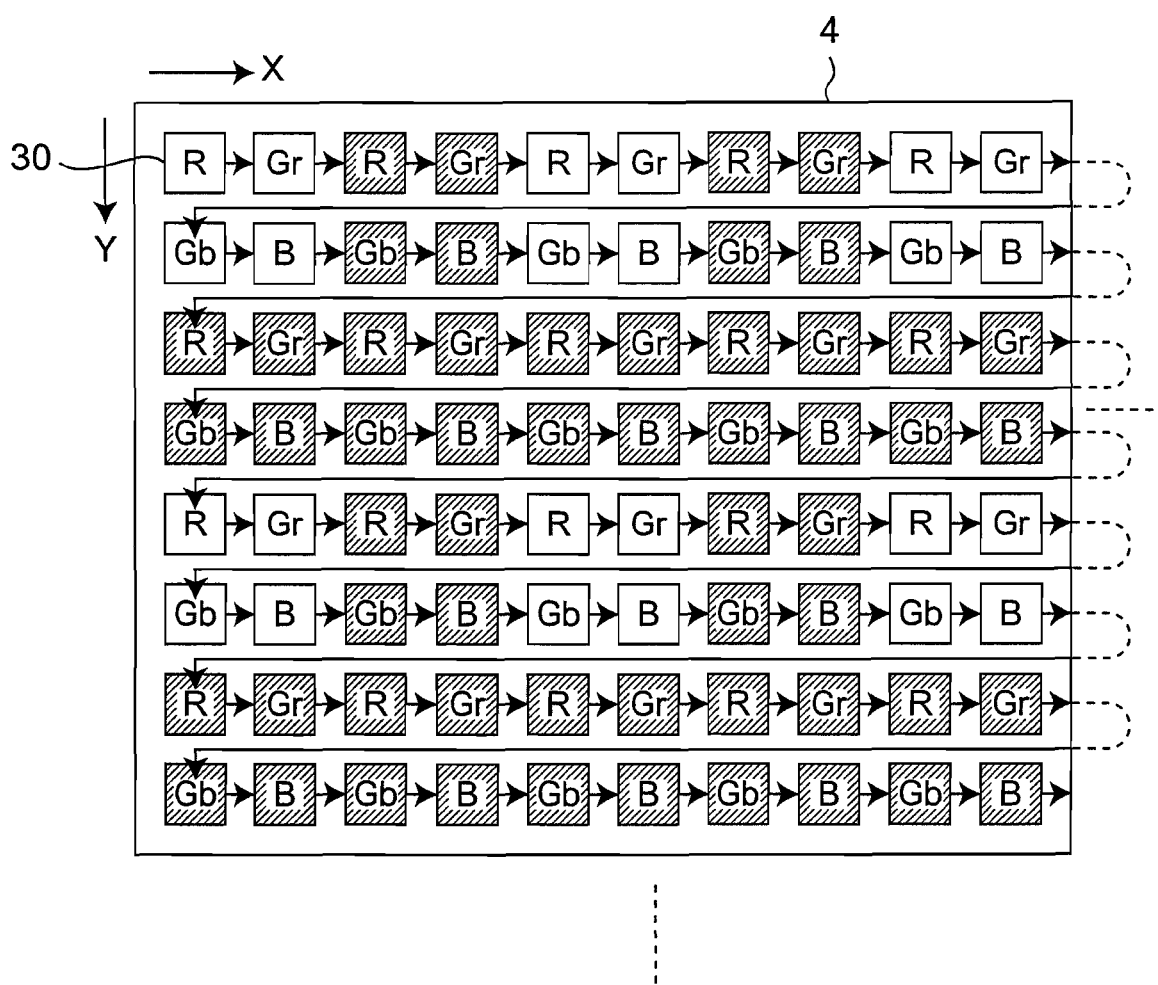
FIG. 2 is a schematic diagram of the imaging unit in the first embodiment of the invention.

FIG. 2 shows the arrangement of the pixels 30 of the imaging unit 4 and the sequence in which the electric signal data accumulated for the pixels is read out. Each pixel is covered with a color filter, and the primary color filters are disposed in a Bayer arrangement. A Bayer arrangement disposes the red (R), green (G), and blue (B) filters in a matrix of R, Gr, Gb, B such as shown in FIG. 2, and is an arrangement that is commonly used to capture color images. Note that Gr denotes green pixels on rows in the x-axis direction that are a combination of a red pixel and a green pixel, and Gb denotes green pixels on rows in the x-axis direction that combine a blue pixel, a red pixel, and a green pixel.

While the color filters are in a Bayer arrangement of primary color filters in this aspect of the invention, another common arrangement disposes secondary color filters in a checkered pattern, and the color filters can be arranged in any desired pattern.

The data read from the pixels of the imaging unit 4 are input to the A/D converter 6 in the sequence denoted by the arrows in FIG. 2, and is converted by the A/D converter 6 to digital signals. The digitized pixel data output from the A/D converter 6 is input in the same order to the downsampling unit 8. For each set of four pixels of the same color, the downsampling unit 8 outputs only the one pixel at the top left corner of the set and treats the other three pixels as downsampled data and does not output the pixel data. For example, if the red (R) pixel at the left end of the first row is the first pixel, the three R pixels that are closest to this first R pixel in the processing sequence are the R pixel that is the third pixel in the first row, the R pixel that is the first pixel in the third row, and the R pixel that is the third pixel in the third row. Of this set of four pixels including these three pixels and the first pixel, data is output for only the one pixel at the left top corner, that is, the first R pixel in this case, and the data for the remaining three pixels in this set is dropped. As a result, the pixels are downsampled to ¼ the original pixel count. The pixel count for one frame output by the downsampling unit 8 thus drops to 960 horizontal by 720 vertical pixels, which is a suitable pixel count for producing video.

The downsampling unit 8 is described here as downsampling the total pixel count to ¼, but the downsampling unit 8 can operate at a different downsampling rate such as ⅑, ¹⁄₁₆, or 1/n2 (where n is a positive integer). More broadly, the downsampling unit 8 can downsample the pixels to 1/N (where N is a positive integer).

The data output from the downsampling unit 8 is output from the image data output pin 14 of the image sensor LSI device 2 and is video processed by the video processing unit 22a.

This operation is completed within the frame period of the video signal or less than ¹⁄₃₀ second in this example, and the video image output from the image data output pin 14 renders one frame in ¹⁄₃₀ second.

Pixel data for 20,736,000 (2,764,800×30/4) pixels is output from the image data output pin 14 in one second in this case. A data transfer rate of approximately 20.8 MHz is therefore sufficient for the external interface connected to the image data output pin 14.

The signals output from the A/D converter 6 are also input to memory 10 in the image sensor LSI.

When the shutter release button (not shown in the figure) for taking still pictures is pressed, the sensor controller 20 outputs a still image recording control signal S3 pulse. When this still image recording control signal S3 pulse is input to the image sensor LSI device 2, the memory controller 12 controls the memory so that the pixel data from the A/D converter 6 is stored to memory 10 and the data for all pixels output from the imaging unit 4 is stored.

When the still image recording control signal S3 is asserted and the data for all pixels in the imaging unit 4 is stored to memory 10, a still image output control signal S4 pulse is applied to read the pixel data for the one picture stored in memory 10. The still image recording control signal S3 and the still image output control signal S4 thus control reading and writing to memory 10. The pixel data stored in memory 10 is output from the memory data output pin 16 of the image sensor LSI device 2. If the interface to the memory data output pin 16 operates at the same 20.8 MHz rate as the interface to the image data output pin 14, 0.133 second (2,764,800/20,800,000) is required to output the pixel data for one picture.

Figure 3:
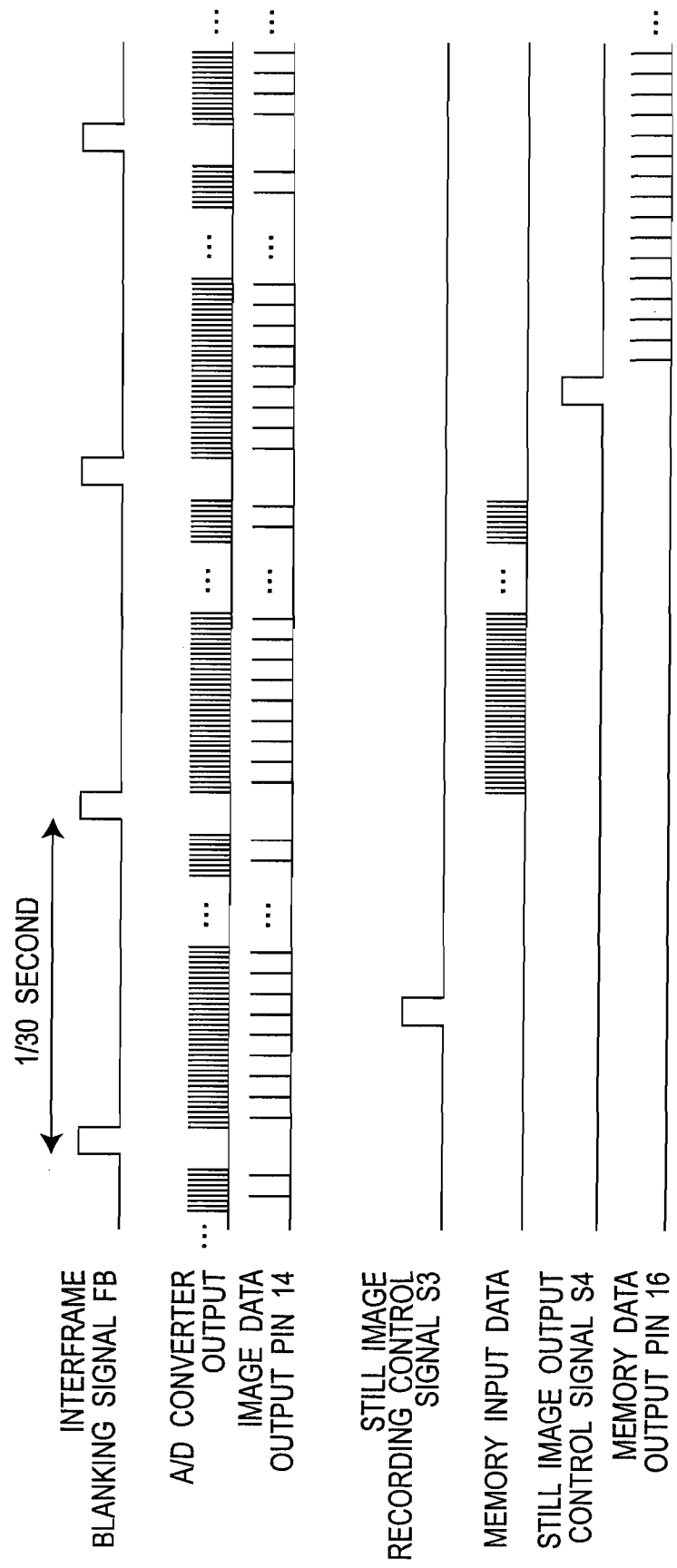
FIG. 3 is a waveform diagram of signals in the image sensor in the first embodiment of the invention.

FIG. 3 is a timing chart of signals in the image sensor LSI device 2. One frame period is the pulse interval of the interframe blanking signal FB between two frames, such as ¹⁄₃₀ second in this example, and the pixel data for one frame is output from the imaging unit 4 during this period. Pixel data for one of every four pixels output from the imaging unit is output from the image data output pin 14.

If the still image recording control signal S3 pulse is asserted while pixel data for a video stream is being output from the image data output pin 14, storing the pixel data to memory 10 starts at the next first interframe blanking signal FB pulse. More specifically, storing pixel data to memory 10 is synchronized to the interframe blanking signal.

Outputting the pixel data stored in the memory 10 during one frame period starts when the still image output control signal S4 is asserted. The pixel data is output from the memory data output pin 16 in this case. The data stored in memory 10 is held in memory until the next data is stored, and the timing of pixel data output from the memory data output pin 16 can be set freely according to the interface to the external device. The timing chart in FIG. 3 shows an example in which the output rate is the same as the output rate of the image data output pin 14.

A feature of this aspect of the invention is that in an image data processing method in which video processing and still picture processing run in parallel, a synchronization signal FB is output every frame for video processing, digital data for each frame is output from the A/D converter synchronized to the synchronization signal FB, and when the still image recording control signal S3 is output to take a still picture, outputting the digital data from the A/D converter for accumulation in memory starts synchronized to the synchronization signal output after the still image recording control signal S3 is asserted.

The digital data written to memory in this case is pixel data with a higher pixel density than the digital data that is output to the video processing unit.

The pixel data stored in memory 10 is output in response to the still image output control signal S4 in this example, but output can be alternatively controlled to output the pixel data for one frame from the memory data output pin 16 as soon as the data is stored to memory or automatically after a specific time. In this case the still image output control signal S4 is not needed. If a 2-port RAM device is used, data could alternatively be output from memory 10 before storing the pixel data to memory 10 is completed.

As described above, the image sensor LSI device 2 outputs A/D converted pixel data as video data through a first channel L1 that includes the downsampling unit 8 and the image data output pin 14, and outputs A/D converted pixel data as still image data through a second channel L2 that includes the memory 10 and the memory data output pin 16. Furthermore, pixel data can be stored to the memory 10 when the downsampling unit 8 is downsampling the data or when the downsampling unit 8 is not downsampling the data. By thus rendering the image sensor LSI device 2 with internal memory 10, still image data can be stored to the memory 10 on the second channel L2 while pixel data is being output to the first channel L1 for video processing.

Second Embodiment

Figure 4:
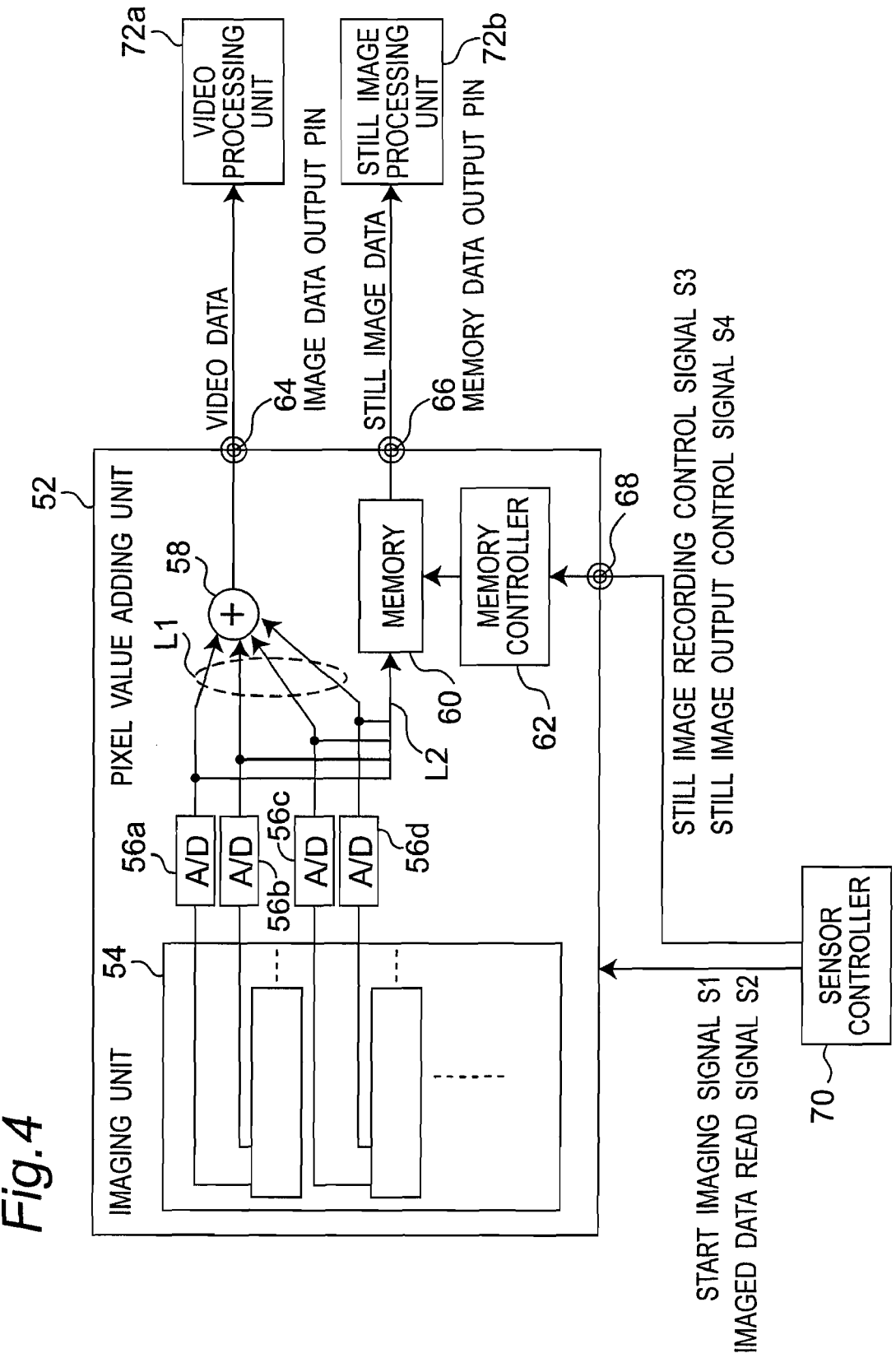
FIG. 4 is a block diagram of a second embodiment of the invention.

FIG. 4 shows an image data processing device according to a second embodiment of the invention.

The image data processing device has an image sensor 52, a sensor controller 70, a video processing unit 72a, and a still image processing unit 72b.

The image sensor 52 has an imaging unit 54 for converting light to an electric charge, four A/D converters 56a, 56b, 56c, and 56d for converting the charges output from the imaging unit 54 to digital data, a pixel value adding unit 58 for adding the digital data output by the A/D converters 56a, 56b, 56c, and 56d, memory 60 for accumulating the digital data from the A/D converters 56a, 56b, 56c, and 56d, and a memory controller 62 for controlling the memory. The image sensor 52 is mounted on a single LSI chip and may also be referred to herein as image sensor LSI device 52.

A sensor controller 70, a video processing unit 72a, and a still image processing unit 72b are connected to the image sensor LSI device 52. The video processing unit 72a and the still image processing unit 72b are arranged as described in the first embodiment. The sensor controller 70 is also arranged as described in the first embodiment.

When the start imaging signal S1 is input, the imaging unit 54 converts light intensity to an electric signal and accumulates the electric signals. When the imaged data read signal S2 is input, the electric signals accumulated in the imaging unit 54 are output from the imaging unit 54. The electric signals for each pixel read from the imaging unit are input to the A/D converters 56a, 56b, 56c, and 56d and converted to digital signals.

The imaging unit 54 of the image sensor 52 shown in FIG. 4 has four pixel reading channels and can read four pixels simultaneously. The imaging unit 54 is shown in detail in FIG. 5.

Figure 5:
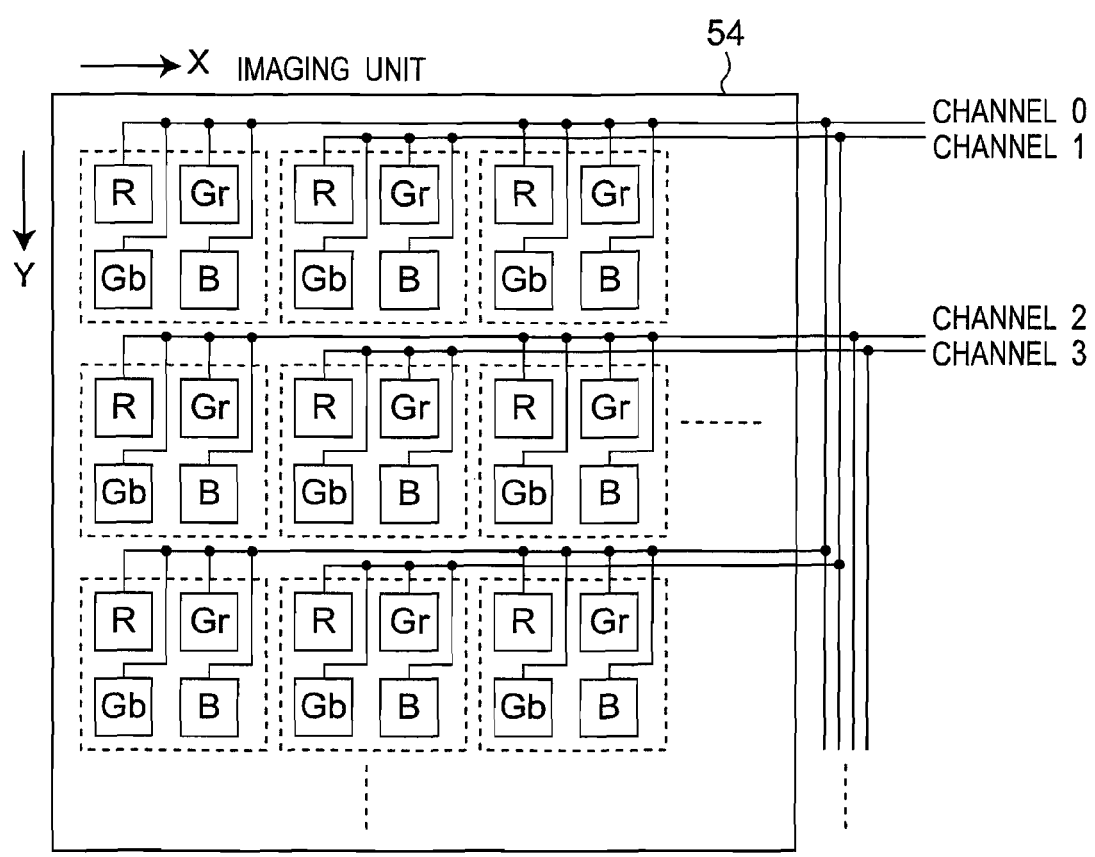
FIG. 5 is a schematic diagram of the imaging unit in the second embodiment of the invention.

As shown in FIG. 5 the imaging unit 54 has pixels arranged in a two dimensional array, that is, on two perpendicular axes (x-axis and y-axis), and has a color filter of a primary color disposed over each pixel in a Bayer arrangement as in the first embodiment. The x-axis is referred to below as "rows" and the y-axis as "columns."

The pixels arranged in two perpendicular directions are grouped into a plurality of blocks where each block has four pixels in a 2×2 matrix. The blocks are also arranged on two perpendicular axes (x-axis and y-axis). The pixels contained in each odd-numbered block (blocks 1, 3, 5, and so forth) in row 1 are connected to the channel 0 line. The pixels contained in each even-numbered block (blocks 2, 4, 6, and so forth) in row 1 are connected to the channel 1 line. The pixels contained in each odd-numbered block (blocks 1, 3, 5, and so forth) in row 2 are connected to the channel 2 line. The pixels contained in each even-numbered block (blocks 2, 4, 6, and so forth) in row 2 are connected to the channel 3 line. More specifically, the pixels in the odd-numbered blocks of the odd-numbered rows are connected to the channel 0 line, the pixels in the even-numbered blocks of the odd-numbered rows are connected to the channel 1 line, the pixels in the odd-numbered blocks of the even-numbered rows are connected to the channel 2 line, and the pixels in the even-numbered blocks of the even-numbered rows are connected to the channel 3 line.

The order in which the four pixels in each block are read is top left (R), top right (Gr), bottom left (Gb), and bottom right (B), that is, left then right on row 1 and left then right on row 2. The colors indicated in parentheses are by way of example only, and the invention is not limited to these colors. In addition, the pixel data contained in the four blocks including the first and second blocks of the first row of blocks and the first and second blocks of the second row of blocks are read in parallel over the lines for the four channels 0, 1, 2, 3. The blocks on row 1 and on row 2 are thus read sequentially two blocks at a time from left to right. The blocks on row 3 and on row 4 are then read sequentially two blocks at a time from left to right.

The blocks in this example contain four pixels in a 2×2 matrix, but each block could contain nine pixels in a 3×3 matrix, 16 pixels in a 4×4 matrix, or n2 pixels in an n×n matrix (where n is a positive integer). More broadly stated, each block contains N pixels (where N is a positive integer).

The pixel value adding unit 58 is described next.

The pixel data from the four adjacent blocks in the row direction and the column direction are output to the pixel value adding unit 58 over the four channels 0, 1, 2, 3 connected to each block. The pixel value of the top left pixel in each of the four blocks is sent to the pixel value adding unit 58 and the pixel values are added. These four pixels are the four pixels of the same color that are in greatest proximity. The pixel value adding unit 58 mixes the pixels but pixel mixing is not limited to simple addition and could instead obtain the average by dividing the sum pixel value by 4 or apply a weighting coefficient before adding the pixel values. The sum of this pixel mixing operation is then output to the video processing unit 72a as video data. The pixel value adding unit 58 is also referred to as a pixel mixing unit because it applies pixel mixing.

Next, the pixel value of the top right pixel in each of the four blocks is then sent to the pixel value adding unit 58, which adds and processes these pixel values in the same way.

Next, the pixel value of the bottom left pixel in each of the four blocks is then sent to the pixel value adding unit 58, which adds and processes these pixel values in the same way. Next, the pixel value of the bottom right pixel in each of the four blocks is then sent to the pixel value adding unit 58, which adds and processes these pixel values in the same way.

A selector that sequentially selects one of the four channels 0, 1, 2, 3 can be used instead of the pixel value adding unit 58. The pixel adding unit and the selector thus combine the data for four pixels into one pixel value, and are thus also referred to as a scaling processor.

The memory 60 is described next.

The A/D converted output of each channel is also written to memory 60. When the still image recording control signal S3 pulse is applied to the memory controller 62, the memory controller 62 stores all pixel data to the memory 60. When the still image output control signal S4 pulse is applied, all pixel data for one image stored in the memory 60 is output from the memory data output pin 66 to the still image processing unit 72b. The pixel data could alternatively be automatically output from the memory data output pin 66 after waiting a specific time after the pixel data is stored to memory 60, or during a pause in video processing by the video processing unit 72a.

FIG. 6 is a timing chart for this second embodiment of the invention. Pixel data is output at the same timing to channels 0, 1, 2, 3. Pixel data acquired at the same time is added together and output as a single data value from the image data output pin 64.

When the still image recording control signal S3 pulse is received, storing pixel data from the four A/D converters to memory starts after the next new frame period starts in the same way as in the first embodiment, and all pixel data from one frame in the imaging unit 54 is stored to memory. In FIG. 6 the four channels of image data input to memory are serially input to memory in four cycles of the imaging unit output channel, but the four channels of pixel data could be output in parallel and input to memory in the same cycle as the output channel.

This second embodiment of the invention can be described in general terms as follows. The A/D converter includes a first A/D converter, a second A/D converter, to an n2-th A/D converter (where n is a positive integer), and the scaling processor 58 is connected to the output of the first A/D converter, the second A/D converter, and the n2-th A/D converter, respectively. The input to the first A/D converter, the second A/D converter, and the n2-th A/D converter is connected to the first channel, the second channel, and the n2-th channel, respectively. The pixels 30 of the imaging unit are grouped into a plurality of blocks each containing n2 pixels, and the pixels in the first block are connected to a first channel, the pixels in the second block are connected to a second channel, and the pixels in the n2 blocks are connected to an n2-th channel, respectively. The output from the first A/D converter, the second A/D converter, and the n2-th A/D converter is also connected to memory.

This second embodiment of the invention can be described in even broader terms as follows. The A/D converter includes a first A/D converter, a second A/D converter, to an N-th A/D converter (where N is a positive integer), and the scaling processor 58 is connected to the output of the first A/D converter, the second A/D converter, and the N-th A/D converter, respectively. The input to the first A/D converter, the second A/D converter, and the N-th A/D converter is connected to the first channel, the second channel, and the N-th channel, respectively. The pixels 30 of the imaging unit are grouped into a plurality of blocks each containing N pixels, and the pixels in the first block are connected to a first channel, the pixels in the second block are connected to a second channel, and the pixels in the N blocks are connected to an N-th channel, respectively. The output from the first A/D converter, the second A/D converter, and the N-th A/D converter is also connected to memory.

As will be known from the foregoing, the image sensor LSI device 52 outputs the A/D converted pixel data as video data over a first channel L1 composed of the pixel value adding unit 58 as a scaling processor and the image data output pin 64, and outputs A/D converted pixel data as still image data over a second channel L2 composed of memory 60 and the memory data output pin 66. Storing pixel data to the memory 60 can be done while the pixel value adding unit 58 is adding the pixel values or when the pixel value adding unit 58 is not adding the pixel values. By thus rendering the image sensor LSI device 52 with internal memory 60, still image data can be stored to the memory 60 on the second channel L2 while pixel data is output to the first channel L1 for video processing.

As described above, pixel data read from the imaging unit 54 is read simultaneously for four pixels at a time over four channels to derive the pixel data for the adjacent pixels of the same color. The output from the imaging unit is input to the four A/D converters, and the pixel data is converted to digital data. The pixel data is output simultaneously from the four A/D converters. The output of the A/D converters is then added by the pixel value adding unit 58 for the adjacent pixels of the same color read at the same time. The sum of the pixel data added by the pixel value adding unit 58 is output to an external device from the image data output pin. The sum of the pixel values can thus be acquired without outputting all pixel data acquired by reading all pixels from the image sensor LSI device 52, and an image with little aliasing can be produced. The external interface can also run at a low frequency, simplifying circuit design and lowering power consumption.

By using the apparatus described above, still images containing image data of the pixel count output by the imaging unit, which in the above description is a still picture at four times the resolution of the video image, can be captured during video recording without downsampling the frame image captured from the video and without stopping video recording.

The present invention can be used in a solid state image sensor.

What is claimed is:

1. An image data processing device comprising:
   an imaging unit that has pixels in a two-dimensional array and outputs analog data photoelectrically converted from each pixel;
   an A/D converter operable to convert the analog data to digital data;
   a video processing unit that executes a video process based on the digital data;
   a still image processing unit that executes a still image process based on the digital data;
   a first channel operable to carry data from said A/D converter to said video processing unit;
   a second channel operable to carry data from said A/D converter to said still image processing unit; and
   memory disposed to said second channel operable to accumulate the digital data output by said A/D converter, wherein:
   said A/D converter comprises a first A/D converter, a second A/D converter, and so forth to an N-th A/D converter (where N is a positive integer), and a scaling process unit connected to an output of each of the first to N-th A/D converters;
   the input of the first A/D converter, the second A/D converter, and so forth to the N-th A/D converter is respectively connected to a first channel line, a second channel line, and so forth to an N-th channel line; and
   the pixels of said imaging unit are divided into a plurality of blocks each containing N pixels, and the pixels in the first block are connected to the first channel line, the pixels in the second block are connected to the second channel line, and the pixels in the N-th block are connected to the N-th channel line.

2. The image data processing device described in claim 1, wherein the output of each of the first to N-th A/D converters is further connected to said memory.

3. The image data processing device described in claim 1, wherein the scaling process unit is an adding unit that adds the outputs of the first to N-th A/D converters.

4. The image data processing device described in claim 1, wherein the scaling process unit is a selector that selects the output of one of the first to N-th A/D converters.

5. An image sensor mounted as a single LSI device, comprising:
   an imaging unit that has pixels in a two-dimensional array and outputs analog data photoelectrically converted from each pixel;
   an A/D converter operable to convert the analog data to digital data;
   a first channel operable to carry the digital data from said A/D converter to a first output pin for video processing;
   a second channel operable to carry the digital data from said A/D converter to a second output pin for still image processing; and
   memory disposed to said second channel operable to accumulate the digital data output by said A/D converter, wherein:
   said A/D converter comprises a first A/D converter, a second A/D converter, and so forth to an N-th A/D converter (where N is a positive integer), and a scaling process unit connected to an output of each of the first to N-th A/D converters;
   the input of the first A/D converter, the second A/D converter, and so forth to the N-th A/D converter is respectively connected to a first channel line, a second channel line, and so forth to an N-th channel line; and
   the pixels of said imaging unit are divided into a plurality of blocks each containing N pixels, and the pixels in the first block are connected to the first channel line, the pixels in the second block are connected to the second channel line, and the pixels in the N-th block are connected to the N-th channel line.

6. The image sensor described in claim 5, wherein the output of each of the first to N-th A/D converters is further connected to said memory.

7. The image sensor described in claim 5, wherein the scaling process unit is an adding unit that adds the outputs of the first to N-th A/D converters.

8. The image sensor described in claim 5, wherein the scaling process unit is a selector that selects the output of one of the first to N-th A/D converters.

9. The image sensor described in claim 5, further comprising a memory controller operable to control said memory.

* * * * *

UNITED STATES PATENT AND TRADEMARK OFFICE
CERTIFICATE OF CORRECTION

PATENT NO. : 7,990,424 B2  
APPLICATION NO. : 11/993942  
DATED : August 2, 2011  
INVENTOR(S) : Takuma Chiba et al.

Page 1 of 1

It is certified that error appears in the above-identified patent and that said Letters Patent is hereby corrected as shown below:

Title page, item [22], "July 7, 2006" should read "July 6, 2006".

Signed and Sealed this  
Twenty-first Day of February, 2012

David J. Kappos  
*Director of the United States Patent and Trademark Office*